Figure 1:
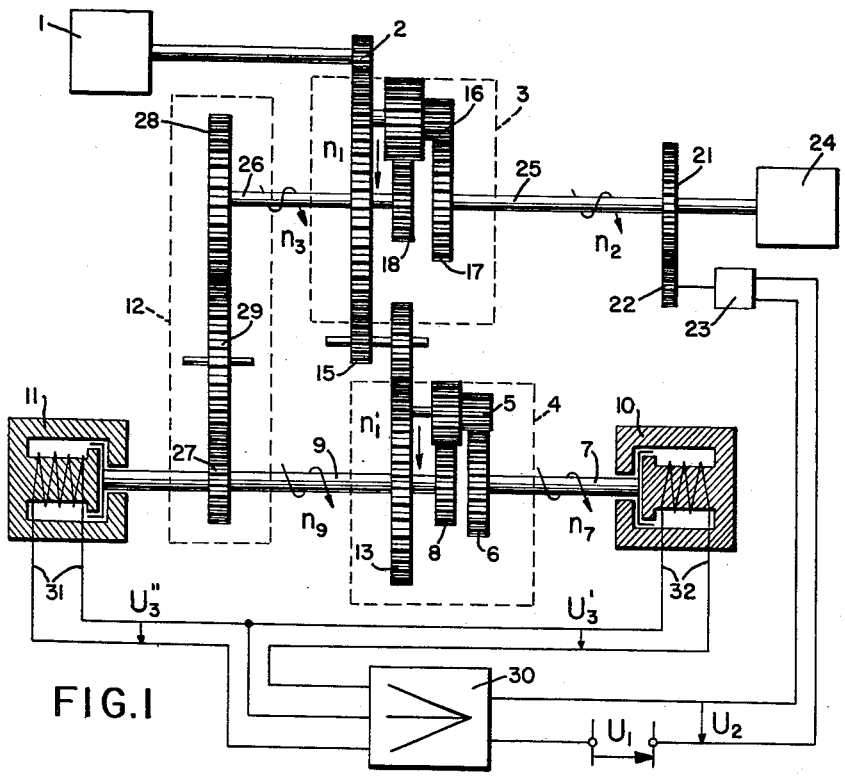

Nov. 5, 1963   H. LOCHER   3,109,324
SPEED CONTROL MEANS
Filed Aug. 10, 1959   5 Sheets-Sheet 1

Inventor:
HANS LOCHER,
by
Herman Seid
Robert W. Fiddler
Attys.

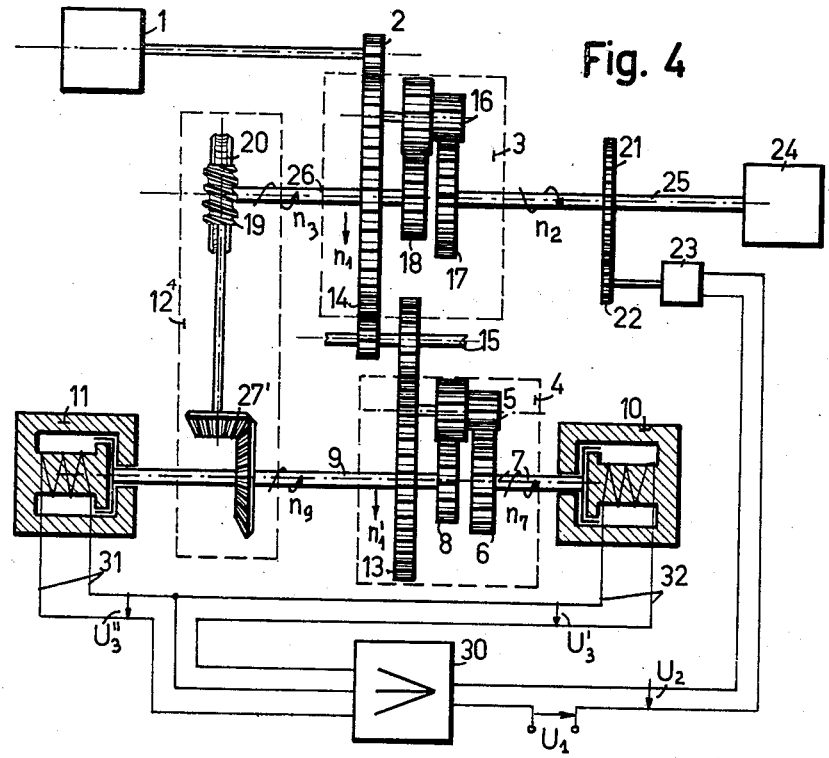
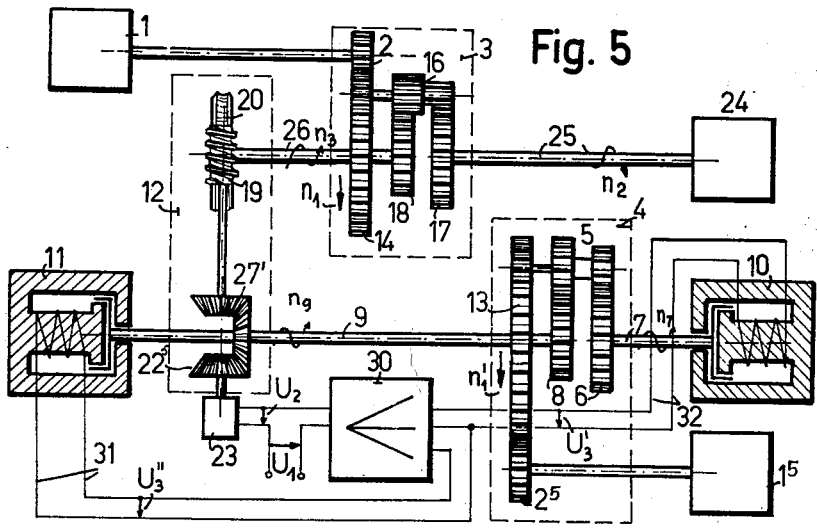

Nov. 5, 1963  H. LOCHER  3,109,324
SPEED CONTROL MEANS
Filed Aug. 10, 1959  5 Sheets-Sheet 3

Inventor:
HANS LOCHER

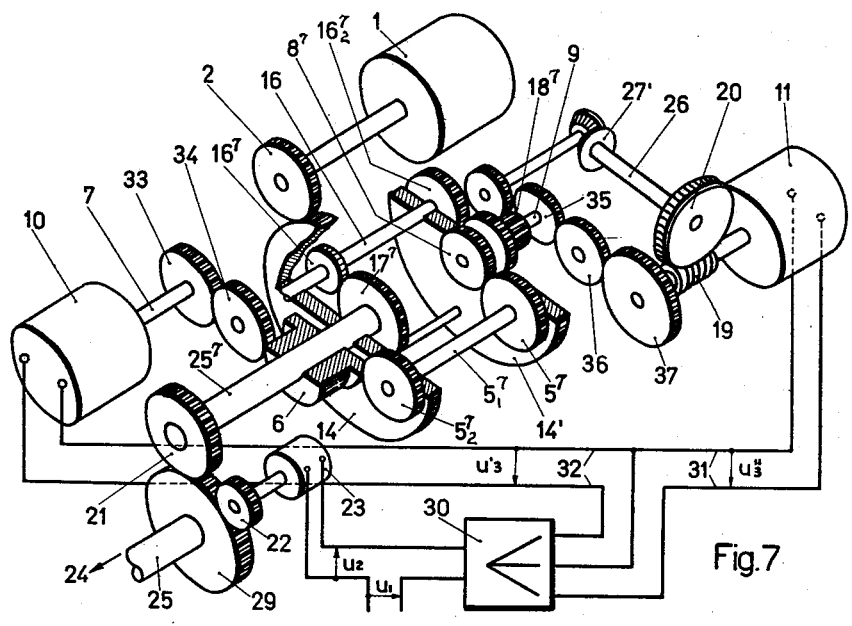
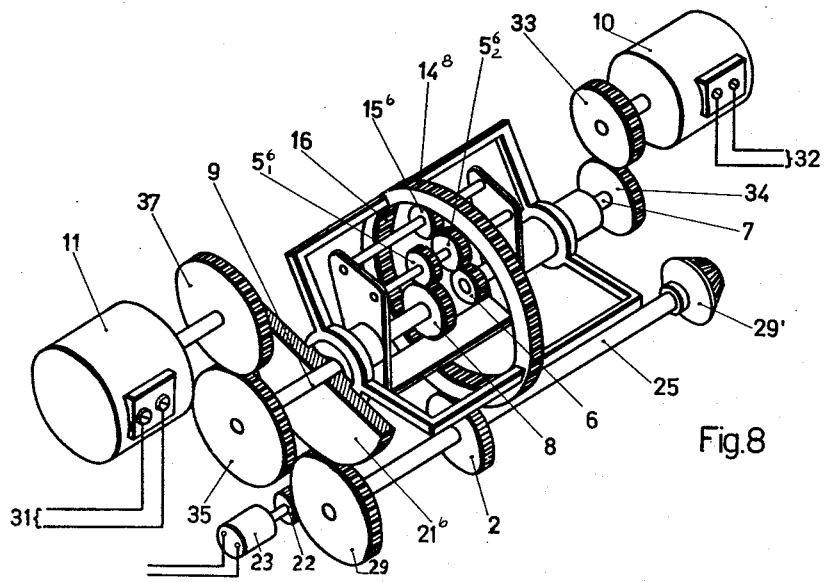

Inventor:
HANS LOCHER

United States Patent Office 3,109,324
Patented Nov. 5, 1963

3,109,324
SPEED CONTROL MEANS
Hans Locher, Uster, Switzerland, assignor to Zellweger Ltd., Uster, Switzerland, a corporation of Switzerland
Filed Aug. 10, 1959, Ser. No. 832,523
Claims priority, application Switzerland Aug. 8, 1958
7 Claims. (Cl. 74—752)

This invention relates to gear drives, more particularly to electrically controlled gearing such as utilized in servo-mechanisms in which the speed of a driven shaft is controlled as a function of an electrical signal.

A variety of gearing exists in which the rotational speed of a driven shaft is regulated in accordance with the intensity of an electrical signal. Conventional gearing of this type is relatively inert so that the load to be driven may be subject only to relatively slow changes of shaft speed. In order to effect rapid variations in shaft speed, as is required in automatically controlled equipment, the above described conventional gearing is obviously unsuitable, since the torque required relative to the mass moment of inertia to be overcome requires that variations in speed be maintained within a relatively small range.

Speed control gearing is employed in which the inertial effects of the driven members on speed variation have been minimized by the selective utilization of one or more of a plurality of gear trains for transmitting the driving energy from the driving member to the driven member so as to attain desired ratios between the speed of the driven and driving shafts. Mechanical positioning devices have been utilized to select the gear train needed to effect the desired speed ratios between the driving and driven member. Where the speed of the driven member is to be made a function of an electrical control signal it is necessary to provide, in addition to the gearing, apparatus for transducing the electrical control signal into mechanical work sufficient to permit shifting to the desired gear train. Such transduced energy is also subject to the difficulties previously noted in connection with the inertial effect of the driven components.

It is with the above problems in mind that the present means have been evolved, means permitting the control of the speed of rotation of a shaft in response to the intensity of an electrical control signal, with the inertial effects of the driven shaft offering minimal interference with the control effects of the electrical signal in influencing the speed of rotation of the driven shaft.

It is accordingly a primary object of this invention to provide means controlling the speed of rotation of a driven shaft with the inertial effects of said driven shaft on the controlling action maintained at a minimum.

Another object of this invention is to provide means controlling the speed of rotation of a rotary member in response to relatively instantaneous variations in intensity of an electrical signal.

A further object of the invention is to provide improved self-compensating servo means for speed control.

A further object of the invention is to provide speed control means, simple in manufacture and maintenance.

These and other objects of the invention which will become hereinafter more apparent, are achieved by provision of substantially constant speed driving means for imparting rotation to the driven member whose speed is to be controlled. Transmission means are arranged between the driving means and the driven means. Control means are arranged to impart a variable control impulse to the aforementioned driving means through intermediate energy transfer gearing means. Some form of braking is provided to effect the speed of said control means so as to permit a variation in the energy transmitted thereby to said driving means. The braking applied to the control means is made a function of an amplified electrical signal representative of the desired variations in speed of said driven means, whereby the speed of said driven means is made a function of this electrical signal and an electrical signal may be provided by a tacho generator coupled to the driven shaft so that speed deviations of the driven shaft from a desired r.p.m. are eliminated. The transmission means and the control means comprise epicyclic gearing, with the term "epicyclic" understood in its classical sense to include both planetary and differential gearing.

A primary feature of the invention resides in the fact that speed control of a driven shaft may be attained, with inertial effects of the driven shaft offering minimal interference with the range of speed variation, by virtue of the fact that the speed regulation is effected first on the novel control gearing coupled to the primary transmission gearing which thereby regulates the speed of the driven shaft.

Another feature of the invention resides in the provision of electrically controlled braking means acting on the control gearing so that the effects of said control gearing on the transmission gearing are made a function of an electrical signal supplied to said braking means.

Another feature of the invention resides in the self-compensating effects arising from utilization of a tacho generator responsive to the speed of the driven member, the output of said tacho generator being utilized as a control signal to actuate the aforementioned braking means.

Both method and apparatus embodying the novel means of this invention are provided for attaining the aforedescribed objects.

Figures 2, 3:
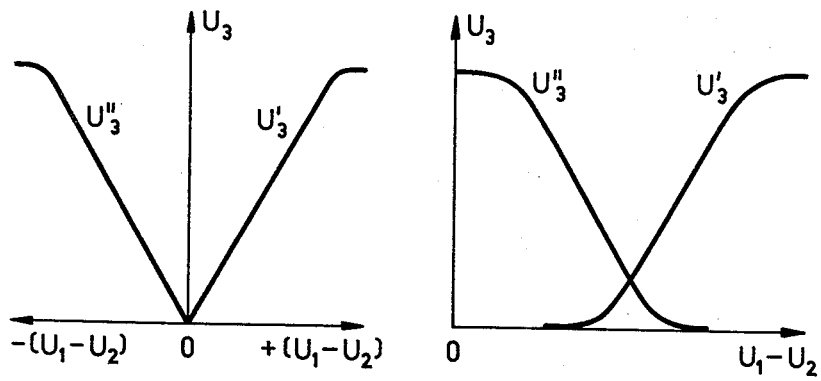
Figure 6:
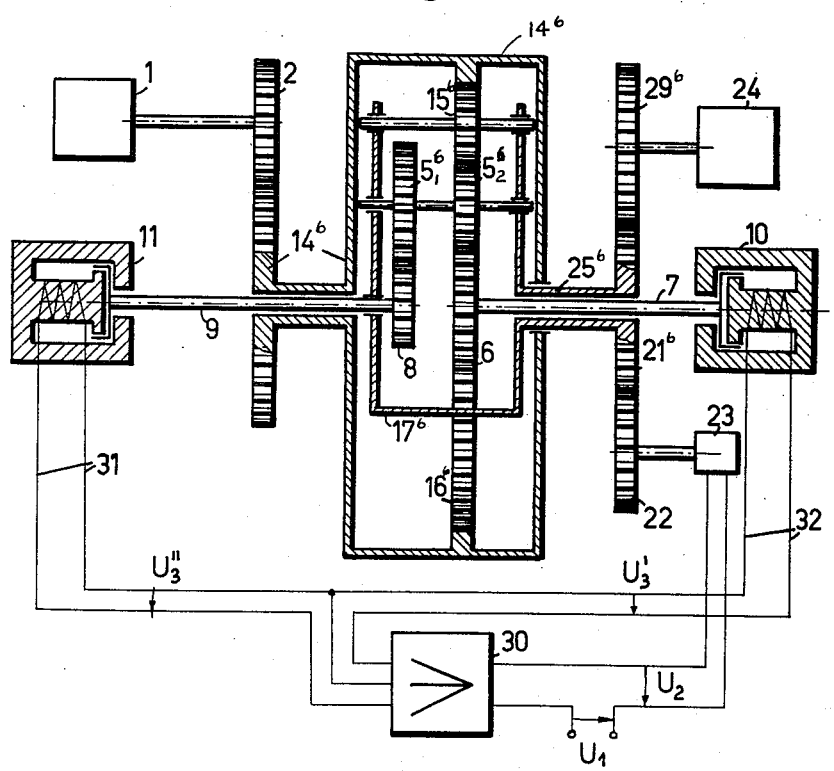
Figure 9:
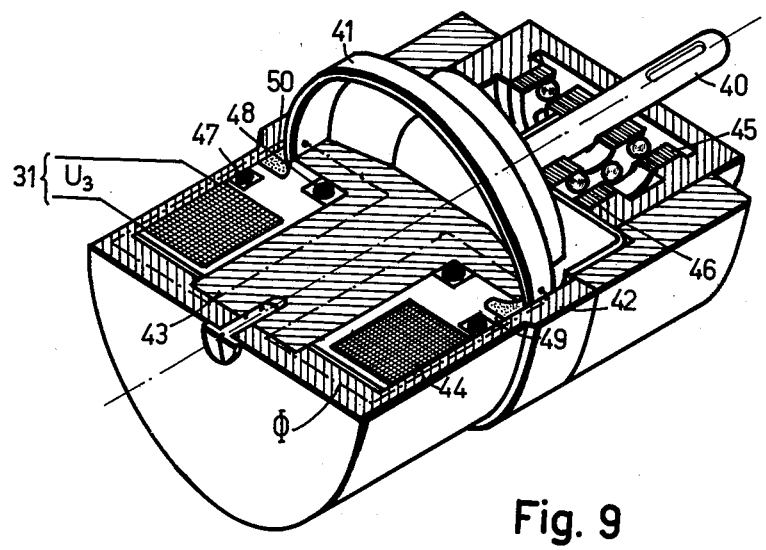

The specific structural details of some embodiments of the invention, and their mode of functioning, will be made most manifest and particularly pointed out in clear, concise and exact terms in conjunction with the accompanying drawings, wherein:

FIG. 1 represents a schematic diagram of the interrelationship between the gearing necessary to provide desired speed control; and FIGS. 2 and 3 represent the electrical characteristics of the amplifier employed; and FIG. 4 illustrates another embodiment of the gearing similar to that illustrated in FIG. 1; and FIG. 5 illustrates a modification of the gearing necessary to effect speed control; and FIG. 6 is a schematic representation of another embodiment of the speed control gearing; and FIG. 7 illustrates a perspective schematic view of the gearing shown in FIG. 4; and FIG. 8 is a schematic perspective view of the gearing illustrated in FIG. 6; and FIG. 9 is a cross sectional perspective view through a preferred embodiment of the magnetic brakes.

Referring now more particularly to the drawings, it will be observed that four species of the invention have been disclosed. The species vary only in some of the structural components of some of the sub-combinations employed so that like numerals will be employed in the various figures to designate like components. Where the sub-combination has been varied, a superscript will be employed along with the numeral applied to the component. Thus the component labeled $12^4$ will be understood to be the embodiment shown in FIG. 4 of the element 12 originally described in connection with FIG. 1.

In the embodiment of the invention illustrated in FIG. 1, motive energy from drive 1 is transmitted via pinion 2 to the novel gearing. The novel gearing comprises transmission gear means 3 coupled to control gear means 4. The transmission gear means 3, and the control gear means 4 are formed by epicyclic gearing of the planetary type. In control gear 4, compound control planet gear 5 meshes with outer control sun gear 6 which is mounted to rotate with outer control driven shaft 7. Inner control sun gear 8 as viewed in the drawing is mounted to rotate inner control driven shaft 9. Electrically controlled brake 10 is positioned to effect the rotation of outer shaft 7, and brake 11 is positioned to effect the rotation of inner shaft 9 for a purpose to be made hereinafter more apparent.

Intermediate gear means 12 are positioned between transmission gear means 3 and control gear means 4 to transmit forces between said gear means 3 and 4. In addition to intermediate gear means 12, the driving energies of gear means 3 and 4 are transmitted between each other via gear train 13, 14 and 15. This gear train comprises planet carrier gear 13 of the control gearing 4, and planet carrier gear 14 of the transmission gear means 3. The planet carrier gears 14 and 13 are inter-connected by means of compound spur gearing 15 as viewed in the drawing.

Transmission gear means 3 includes a compound transmission planet gear 16 meshing with outer transmission sun gear 17 and inner transmission sun gear 18.

Load shaft spur gear 21 meshes with tacho generator spur drive gear 22 to effect rotation of the shaft of tacho generator 23.

The load 24 is driven by the energy from drive means 1 through transmission gear means 3. This driving energy is transmitted to the load 24 over driven load shaft 25 which as seen in the drawing is coupled to rotate with outer transmission sun gear 17. Inner transmission shaft 26 is coupled to rotate with inner transmission sun gear 18, as viewed to the left in FIG. 1. The energy transference between control gear means 4 and transmission gear means 3 which is effected by intermediate gear means 12 occurs through pinion 27 on inner control shaft 9 and pinion 28 on inner transmission shaft 26, both of said pinions 27 and 28 meshing with intermediate spur gear 29.

The input terminals of amplifier 30 are electrically coupled to tacho generator 23 to receive an input signal $U_2$ from tacho generator 23, along with control signal $U_1$, which is representative of the desired speed to be imparted to load 24. The output of amplifier 30 is connected via lines 31 and 32 to inner control shaft brake 11, and outer control shaft brake 10, respectively.

In the embodiment of the invention illustrated in FIG. 4, intermediate gear means 12 have been modified so that the spur gear train 27, 28 and 29 of the FIG. 1 embodiment is replaced by a worm and bevel gear train as shown in FIG. 4. The superscript 4 has been applied to the numeral 12 in the FIG. 4 embodiment to indicate that this intermediate gear means 12 is modified in accordance with this FIG. 4 teaching. In this FIG. 4 embodiment of the novel structure, the intermediate gearing $12^4$ comprises a worm gear 19 meshing with worm wheel 20 arranged on inner transmission shaft 26 of transmission gearing 3. The worm 19 is mounted on a shaft to rotate with bevel gear train 27'. The horizontal bevel gear of bevel gear train 27' is mounted on the shaft with worm 19, and the vertical bevel gear of bevel gear train 27' is mounted on inner control shaft 9 of control gearing 4 as viewed in FIG. 4. All the other components of the FIG. 4 embodiment remain the same as those described in connection with the FIG. 1 embodiment, and it will be apparent to those skilled in the art that the only difference between the FIG. 1 and FIG. 4 embodiments of the invention resides in the type of gearing employed in the intermediate gear means 12, the worm and bevel gearing of FIG. 4 being substituted for the spur gearing of FIG. 1.

In the FIG. 5 embodiment of the invention, the tacho generator 23 is coupled to the inner control shaft 9 of the control gear means 4. This is accomplished by substituting tacho generator bevel gear $22^5$ for the tacho generator spur gear 22 utilized in FIGS. 1 and 4 embodiments. Tacho generator bevel gear $22^5$ is arranged to mesh with bevel gear train 27' as viewed in the drawing. Additionally, the drawing of the FIG. 5 embodiment illustrates how control gear means 4 may be provided with its own control drive means $1^5$ which is coupled to control planet carrier gear 13 via control drive pinion $2^5$.

In the FIG. 6 embodiment of the invention, the superscript 6 will be employed in conjunction with the numerals to indicate how the components previously described are modified to attain the FIG. 6 embodiment of the invention. In this FIG. 6 embodiment, transmission planet carrier gear $14^6$ is shown to comprise a gear box which carries internally toothed gear $16^6$ which meshes with gear $15^6$ which in turn drives compound gear $5^6{}_1$, $5^6{}_2$, meshing with sun gears 8 and 6 respectively. Sun gears 8 and 6 are connected respectively to inner control shaft 9 and outer control shaft 7 as disclosed in connection with the FIGS. 1 and 4 embodiments.

The sun gear $17^6$ is arranged to be driven by gear $15^6$. A hollow shaft $25^6$ transmits the rotation of gear $17^6$ to load 24 via pinion $21^6$ which engages gear $29^6$.

It will of course be understood by those skilled in the art that the tacho generator 23 which is here shown coupled to load 24 as in the FIGS. 1 and 4 embodiments, may also be coupled with control shaft 9 as in the FIG. 5 embodiment to attain the results of the FIG. 5 embodiment.

The perspective view of the commercial structure of the FIG. 4 embodiment, illustrated in FIG. 7 indicates how the planetary gearing constituting the transmission gearing and the control gearing may be formed as a unitary structure permitting elimination of gear train 15. This is accomplished by utilizing ring gear 14, 14'.

Arranged within a unitary housing containing the transmission gear components $16^7$ and $17^7$ and the control gear components $5^7$, $6^7$ and $8^7$ is shaft $5^7{}_1$ supporting in addition to planet gear $5^7$, planet gear $5^7{}_2$ which meshes with spur gear $5^7{}_2$ and gear 34 in engagement with pinion 33 on control shaft 7 of brake 10. Similarly, sun gear $8^7$ is mounted coaxially with sun gear $18^7$ on shaft 9 which supports spur gear 35 forming a part of gear trains 36 and 37 which are coupled to brake 11 via worm 19 as viewed to the right in FIG. 7. Sun gear $6^7$ is rotatably mounted with respect to load shaft $25^7$ which rotates load shaft spur gear 21 engaging gear 29 to driven load shaft 25, as viewed to the left in FIG. 7.

In FIG. 8 the perspective view of the structure illustrates an embodiment in which the drive pinion 2 engages a modified form of epicyclic gear box $14^8$ similar to planet carrier gear $14^6$ of FIG. 6. It will be observed from a comparison of FIG. 6 and FIG. 8 that the primary distinction resides in the fact that the gear teeth shown engaging with pinion 2 in FIG. 6 are arranged externally of the gear box $14^8$ in FIG. 8. Brakes 10 and 11 instead of directly affecting the rotation of shafts 7 and 9 respectively as in FIG. 6 transmit their braking force to these shafts 7 and 9 respectively via gear trains 33, 34 and 35, 37 respectively. Spur gear 29 engages gear $21^6$ to transmit the controlled rotational energy of driven shaft 25 to the load (not shown). It will of course be understood that pinion 2 is freely mounted on shaft 25 and is driven by the driving means (not shown).

The brakes 10 and 11 disclosed in connection with FIGS. 1–8 are preferably of the type illustrated in FIG. 9. These brakes may be of a variety of types, e.g.: eddy current brakes having a braking torque proportional to the exciting voltage; or electro-hydraulic brakes, in which the hydraulic energization of the brake is controlled by amplifier 30; or mechanical brakes under the control of amplifier 30.

However, the iron powder brakes illustrated in FIG. 9 are found most satisfactory. In these brakes, the shaft 40 is supported for rotation with plate shaped rotor 41 in brake housing 42. A mushroom shaped iron core 43 is positioned with respect to brake housing 42 so that an air gap is formed within which the upstanding lips of rotor 41 projects. Windings 44 are arranged about the stem of mushroom shaped core 43 as viewed in the drawing. Ball bearings 45 and 46 are provided about shaft 40 mounting said shaft for rotation with respect to brake housing 42. Packings 47 and 48 are arranged about coil support 49, serving to retain iron powder 50 in position in the air gap as illustrated in the drawing. Packings 47 and 48 serve to prevent the passage of the iron powder from the air gap to the wnidings 44. It will be noted that the iron powder 50 contacts the upstanding lips of plate shaped rotor 41 along the inner surface thereof. The powder is selected of a granularity such that the rotor 41 may move therein with a minimal of frictional interference.

Operation

The aforedisclosed embodiments of the novel speed control gearing may be most optimumly utilized in maintaining shaft speed of a given load within desired speed ranges.

The novel speed control gearing here presented permits shaft speed control without having the inertial effects of the controlled shaft influence the control action. This is accomplished by the use of control gear means 4 coupled to the transmission gear means 3 via intermediate gear means 12. The intermediate gear means 12 serve to transmit forces between control gear means and the transmission gear means in a way so that control can be effected of the control gear means with the inertial effects of the transmission gear means playing a relatively minor role. Thus control of the transmission gear means can readily be effected with only the relatively small inertial effects of the control gear means influencing the controlling action. Thus though the inertial effects of the transmission components are still present, the speed of rotation of these components may be influenced by exerting a braking action on the rotating components 7 and 9 of the control gear means 4. The moments of inertia of the rotating parts connected to the control gear shafts 9 and 7 can readily be designed so as to be small compared with the torque appearing on load shaft 25.

If the control range for the r.p.m. $n_2$ is relatively small, e.g. $\pm 10\%$ to $\pm 30\%$ then the reduction ratio of intermediate gear means 12 can be selected of a relatively high nature to attain the above described mode of operation. Where it is necessary to obtain a relatively large control range requiring a high gear ratio in intermediate gear means 12, the r.p.m. $n'_1$ of the control gear means 4 is increased to increase the r.p.m. of shafts 7 and 9 requiring an increase in inertial mass of the components connected to shafts 9 and 7 of control gear means 4. Desired dimensioning of the speed control gearing components is subject to design by standard design procedures.

A simple way of bringing the r.p.m. $n_9$ of inner control shaft 9 to transmission gear means 3 is by means of the spur gear arrangement illustrated in FIG. 1 in the intermediate gear means 12. Other arrangements are also possible as will be apparent to those skilled in the art.

In the FIG. 1 embodiment of the invention, any desired selection may be made of the r.p.m. $n_1$ of the transmission planet carrier gear 14 of transmission gear means 3, and the r.p.m. $n'_1$ of the control planet carrier gear 13 of the control gear means 4. Depending on the selection of the speeds $n_1$ and $n'_1$ as indicated on the drawing, the speeds $n_2$, $n_3$, $n_7$ and $n_9$ will result. And the characteristics of the novel speed control gearing will be determined.

Drive 1 operates at a substantially constant r.p.m. which is transmitted to load 24 via transmission gear means 3. However, in order to eliminate many undesired variations in this speed, or in order to vary this speed in accordance with a desired control signal $U_1$, the novel speed control gearing here presented may be utilized. To this end, control gears means 4 acts upon the transmission gear means 3 in accordance with the output of amplifier 30.

It will be apparent from the FIGS 2 and 3 that in the event of an undesired increase in the speed $n_2$ of load drive shaft 25, the tacho generator 23 will produce an electrical signal $U_2$ indicative of this speed increment. This signal $U_2$ is fed into amplifier 30 along with control signal $U_1$. The output voltages of the amplifier will be a function of the input voltages $U_1$ and $U_2$. The output signal $U'_3$ will control the energization of outer control brake 10, and the amplifier output signal $U''_3$ will control the energization of inner control brake 11. Amplifier 30 acts as an error amplifier in which positive input signals $+ (U_1-U_2)$ and negative input signals $- (U_1-U_2)$ are separately amplified. In this situation, as illustrated in FIG. 2, the control signal $U'_3$ for the negative input signals $- (U_1-U_2)$ is approximately zero and increases as a substantially linear function for both negative and positive input signals to a limit value which is so dimensioned that the electrically controlled brake will be sufficiently excited. The same mode of operation obtains with control voltage $U''_3$ except for the fact that the range of $- (U_1-U_2)$ is controlled.

The amplifier characteristics illustrated in FIG. 3 show how for conditions in which the input signal does not change polarity permitting a somewhat simpler amplifier design. Under these conditions of non-polarity change, control signal $U_1$ which represents the desired value of the r.p.m. $n_{22}$ is provided. The tacho generator 23 provides an output signal which is representative of the controlled r.p.m. $n_2$ of the load. Thus the r.p.m. $n_2$ always corresponds to the control signal $U_1$ representing the desired load shaft speed $n_2$.

Load 24 is driven at r.p.m. $n_2$ which can be varied from its desired value. The controlled r.p.m. $n_2$ of the outer transmission sun gear 17 and its associated driven load shaft 25 can be influenced at a substantially constant r.p.m. $n_1$ of the transmission planet carrier gear 14 by changing the r.p.m. $n_3$ of the inner shaft 26 of the transmission gear means 3. This r.p.m. $n_3$ of the inner driven shaft is determined by the gear ratio $r_{12}$ of the intermediate gear means 12 which determine the speed ratios between the r.p.m. $n_9$ of inner control shaft 9 and inner transmission shaft 26.

The epicyclic nature of the gearing employed in forming transmission gear means 3 and control gear means 4 permits an increase in speed of either the inner or outer shaft of the aforementioned gear means. Thus where brake 10 is sufficiently excited by control voltage $U'_3$ then the r.p.m. $n_7$ of outer control shaft 7 is reduced, and the r.p.m. $n_9$ of inner control shaft is increased. Reduction of the r.p.m. $n_9$ of inner control shaft 9 requires application of force by brake 11 as will be apparent from the drawing. The r.p.m. $n_9$ of inner shaft 9 can be varied from zero to a maximum which will usually be approximately 20% of $n_2$. The dimensioning of the control gear and the determination of the gear ratios of the transmission gear means 3, of the second planetary gear 4 and the intermediate gear means 12 are determined by the following conditions.

(1) by the range of variation of the r.p.m. $n_2$ to be controlled from $n_{2min}$–$n_{2max}$, which range of variation is given by the design of the control gear, (2) by the maximum braking torque $M_B$ which can be produced by any of the two brakes 10 and 11, and (3) by the requirements with regard to the dynamic behavior of the control gear due to the mass moment of inertia, which limits the speed at which the r.p.m. $n_2$ can be controlled.

In the FIG. 4 embodiment of the invention, the intermediate gear means 12 have been varied by the use of a worm and wheel gear train and a bevel gear train which results in an irreversible intermediate gearing. This irreversible gearing prevents the transmission of any torque from the load to the control gear means.

The operation of the FIG. 4 structure is similar to that described in connection with FIG. 1 in that upon the occurrence of an undesired speed condition in shaft 25, amplifier 30 receives a signal $U_2$ which by comparison with control signal $U_1$ provides an output $U''_3$ and $U'_3$ actuating brakes 11 and 10 respectively to influence control shafts 9 and 7 respectively which results in the transmission of a positive or negative driving force to transmission gear means 3 thus increasing or decreasing the speed of rotation $n_2$ of load driving shaft 25.

The static torque of the control gear means 4 produced as a result of load 24 is reduced by the use of irreversible intermediate gear means 12. The torque is completely taken up by worm wheel 20 and worm 19 as a result of the fact that the tangent of the pitch angle of worm 19 is smaller than the coefficient of friction between the worm 19 and wheel 20.

In the FIG. 5 embodiment, the tacho generator 23 is shown coupled to the inner control shaft 9. This arrangement produces a control signal $U_2$ from the tacho generator which is representative of the r.p.m. $n_9$ of shaft 9. The electrical control signal $U_1$ and the voltage $U_2$ are fed to the input of amplifier 30 as in the FIGS. 1 and 4 embodiments, and the output of this amplifier 30 is employed to energize brakes 10 and 11. The type of tacho generator 23 is one which will provide a D.C. signal so that either a D.C. generator, or an A.C. generator with an appropriate rectifier may be employed. If however the sense of rotation of shaft 25 is reversible, then only a D.C. generator may be utilized.

Operation of the FIGS. 6 and 8 embodiments is like that of the aforedescribed structures. As noted however the entire gear box $14^6$ is driven by drive pinion 2. The control gearing components are arranged within the gear box $14^6$ for actuation by brakes 10 and 11 so that the gear box functions as the intermediate gearing components of the FIGS. 1, 4 and 5 embodiments.

In the FIG. 7 embodiment of the invention, the brake 10 acting through shaft 7 and gear train 33, 34 controls the motion of sun gear $6^7$ which is movable on the driven load shaft $25^7$. Sun gear $6^7$ meshes with planet gear $5^7_2$ causing rotation of shaft $5^7_1$ which supports planetary gear $5^7$ as viewed in the drawing. Planetary gear $5^7$ in turn meshes with control gearing sun gear $8^7$ extending through the ring gear 14' and meshing with gear train 35, 36 and 37 so that as in the FIG. 4 embodiment the brake 11 acts on the control gearing sun gear $8^7$. The worm 19 meshing with worm gear 20 on shaft 26 supporting bevel gear 27' forms the intermediate gearing similar to that of FIGS. 1, 4 and 5. Pinion $16^7_2$ meshes with sun gear $8^7$, and pinion $16^7$ meshes with transmission gearing sun gear $17^7$ to drive the driven load shaft $25^7$ and thereby the load 24 through gear train 21, 29. The r.p.m. of the gear 21 is imparted to the tacho generator 23 by means of pinion 22 as heretofore described so that the output signal $U_2$ from the tacho generator will be fed to the amplifier 30 as before. The braking action exerted by brakes 10 and 11 are subject to the inertial effects of the control gearing components 5, 6, etc. and the effects of the transmission gearing components 16, 17, 18, etc. are substantially reduced by means of the intermediate gearing 19, 20 and 27 as in FIG. 4.

It is thus seen that novel means have been provided for effecting speed control of a rotary driving shaft with the inertial effects of said driving shaft offering minimal interference with speed control. This is accomplished by utilization of control gear means having relatively small inertial masses with said control gear means coupled to the driving shaft so as to permit regulation of its rotation.

The above disclosure has been given by way of illustration and elucidation, and not by way of limitation, and it is desired to protect all embodiments of the herein disclosed inventive concept within the scope of the appended claims.

What is claimed is:

1. Apparatus for controlling the rotation of a driven rotary member, said apparatus comprising: epicyclic transmission gearing extending between and coupled to a drive and the driven member; epicyclic control gearing drivingly coupled to said transmission gearing, the components of said control gearing having a moment of inertia lower than that of said transmission gearing; intermediate gearing drivingly coupled between said control gearing and said transmission gearing to transmit torque therebetween; a first brake acting on said control gearing; a second brake acting on said control gearing; an electrical control for said brakes; and a control signal source transmitting a signal to said electrical control energizing said brakes, whereby the relatively low moment of inertia control gearing may be speed regulated to effect speed regulation of a relatively high inertial mass.

2. Apparatus as in claim 1 in which said transmission gearing comprises: a carrier gear having an input driving connection thereto; a first sun gear drivingly engaged for rotation therewith; a compound transmission planet gear drivingly engaged with said first sun gear for rotation therewith; a transmission sun gear meshing with said planet gear; a driven load driving shaft driven by said transmission sun gear; and a second driven transmission shaft drivingly engaged by said first sun gear and coupled to said intermediate gearing.

3. Apparatus as in claim 2 in which said control gearing comprises: a compound control planet gear; a control sun gear meshing with said planet gear; and a control shaft extending from said sun gear into a position where its rotation will be affected by said second brake.

4. Apparatus as in claim 1 in which said brake comprises: a core; windings about said core coupled to said control signal source; iron powder adjacent said core; a shaft extending through said iron powder; and a plate shaped rotor mounted on said shaft extending from said control gearing in said powder, whereby upon passing of a control signal to said windings the iron powder will be magnetized and engage said rotor.

5. Apparatus for electrically controlling the r.p.m. of a load, said apparatus comprising: an epicyclic transmission gear, said transmission gear including a driven shaft coupled with the load, and a second driven transmission shaft; an epicyclic control gear coupled to said transmission gear, said control gear including an inner driven shaft; a first electrically controlled brake acting upon said inner driven shaft, said control gear including an outer driven shaft; a second electrically controlled brake acting upon said outer driven shaft; an intermediate gear coupling said transmission gear and said control gear and transmitting the r.p.m. of said control gear inner driven shaft to said transmission gear second driven shaft; a differentiating amplifier controlling the energy impulse supplied to the brake; a tacho generator driven by said transmission gear load driving shaft to provide a signal to said amplifier representative of the actual value of the r.p.m. of said load shaft; and a control signal source providing a signal to said amplifier representative of the desired load r.p.m., whereby the amplifier output will be the difference between said signals.

6. Apparatus as in claim 5 in which said transmission gear and said control gear are combined in a single planetary gear.

7. Apparatus as in claim 5 in which said intermediate gear comprises: a worm and worm gear extending between said transmission shaft and said control gear shaft.

References Cited in the file of this patent

UNITED STATES PATENTS

| | | |
|---|---|---|
| 1,887,705 | Worrall | Nov. 15, 1932 |
| 2,330,821 | Finzi | Oct. 5, 1943 |
| 2,384,776 | Trofimov | Sept. 11, 1945 |
| 2,429,570 | Trofimov | Oct. 21, 1947 |
| 2,459,829 | Maxwell | Jan. 25, 1949 |
| 2,575,360 | Rabinow | Nov. 20, 1951 |
| 2,605,876 | Becker | Aug. 5, 1952 |
| 2,745,297 | Andrus | May 15, 1956 |
| 2,847,876 | Willard | Aug. 19, 1958 |
| 2,895,348 | Beachler | July 21, 1959 |